United States Patent
Tanaka et al.

(10) Patent No.: US 8,434,816 B2
(45) Date of Patent: May 7, 2013

(54) VEHICLE BODY STRUCTURE FOR AUTOMOBILE

(75) Inventors: Hirofumi Tanaka, Wako (JP); Satoru Yamaguchi, Chiyoda-ku (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/556,517

(22) Filed: Jul. 24, 2012

(65) Prior Publication Data

US 2013/0026792 A1 Jan. 31, 2013

(30) Foreign Application Priority Data

Jul. 30, 2011 (JP) .................................. 2011-167858

(51) Int. Cl.
*B62D 25/16* (2006.01)
*B62D 25/24* (2006.01)

(52) U.S. Cl.
USPC .......................................... 296/198; 280/849

(58) Field of Classification Search .................. 296/198, 296/39.1, 1.07, 1.08; 280/847–849
See application file for complete search history.

(56) References Cited

U.S. PATENT DOCUMENTS

| | | | | |
|---|---|---|---|---|
| 4,227,718 A | * | 10/1980 | Durben | 280/770 |
| 4,735,427 A | * | 4/1988 | Fuchs | 280/847 |
| 5,267,752 A | * | 12/1993 | Miller | 280/848 |
| 6,155,624 A | * | 12/2000 | Bienenstein, Jr. | 296/37.1 |
| 6,821,605 B2 | * | 11/2004 | Fiorinelli et al. | 428/159 |
| 6,880,883 B2 | * | 4/2005 | Decker et al. | 296/203.02 |
| 7,497,509 B2 | * | 3/2009 | Omiya et al. | 296/198 |
| 7,810,828 B2 | * | 10/2010 | Sugiyama et al. | 280/152.05 |
| 8,146,987 B2 | * | 4/2012 | Uchino | 296/198 |
| 2013/0026792 A1 | * | 1/2013 | Tanaka et al. | 296/198 |

FOREIGN PATENT DOCUMENTS

JP 405238428 * 9/1993 .................... 296/198
JP 07-028060 Y2 6/1995

* cited by examiner

*Primary Examiner* — Glenn Dayoan
*Assistant Examiner* — Gregory Blankenship
(74) *Attorney, Agent, or Firm* — Westerman, Hattori, Daniels & Adrian, LLP

(57) ABSTRACT

A tongue of a finger hook of an openable area is opened outward about a resin hinge by pressing the tongue from the inner side of the inner fender. When the finger hook is pulled by the finger hooked therein, the openable area undergoes elastic deformation and can be opened from the fender panel. When the openable area is opened, a gap α is formed between the fender panel and the openable area. In order to pull the finger hook, the finger is inserted into the finger hook from the resin hinge side to the slit portion side.

8 Claims, 11 Drawing Sheets

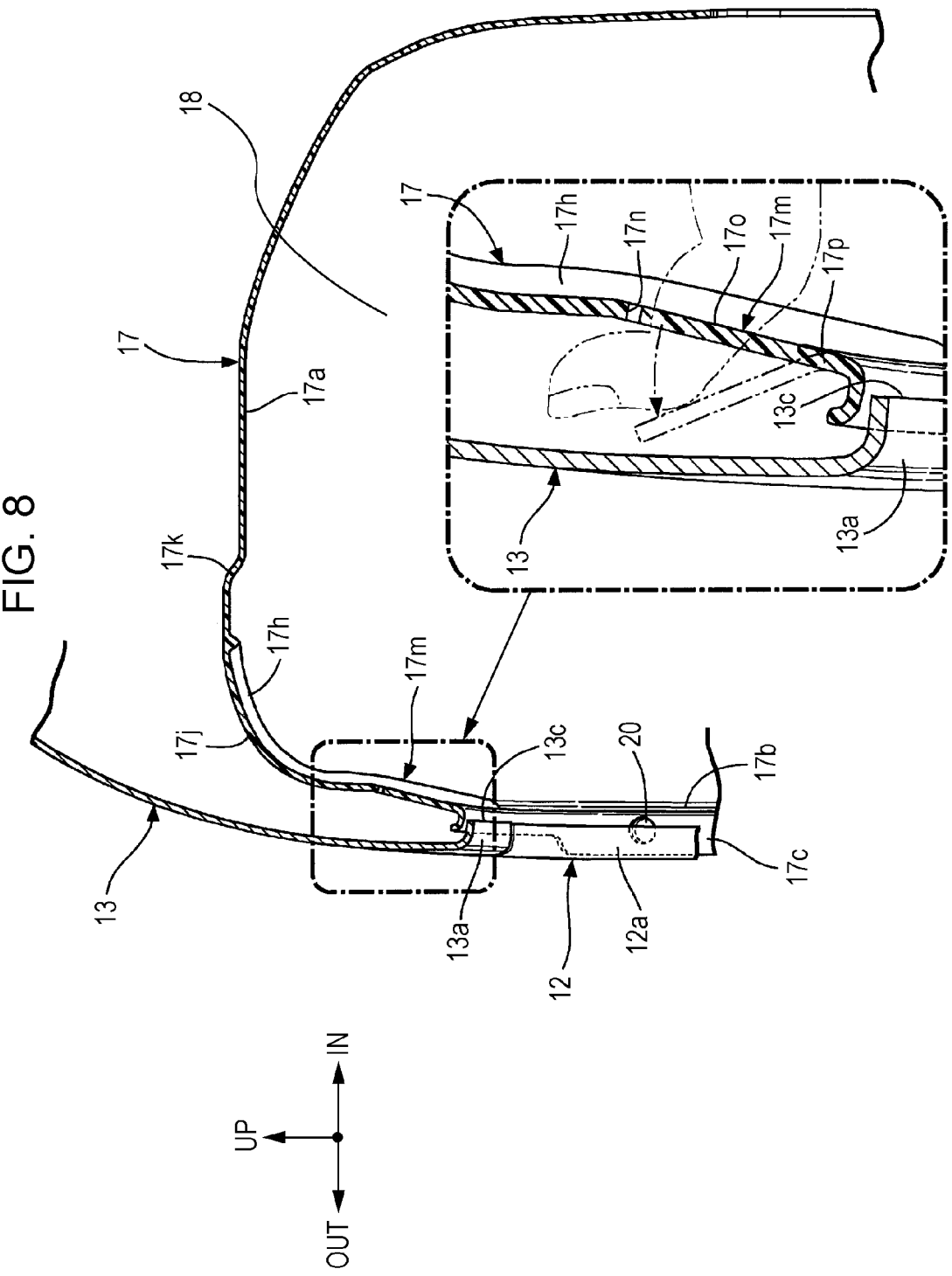

VEHICLE BODY STRUCTURE FOR AUTOMOBILE

CROSS REFERENCES TO RELATED APPLICATIONS

The present application claims priority under 35 U.S.C. §119 to Japanese Patent Application No. 2011-167858, filed Jul. 30, 2011, entitled "Vehicle Body Structure for Automobile". The contents of this application are incorporated herein by reference in their entirety.

TECHNICAL FIELD

The present application relates to a vehicle body structure for an automobile that includes an inner fender, which is disposed on an inner side of a wheel arch of a fender panel with respect to a vehicle width direction and opposes an outer peripheral surface of a tire, so as to form a wheel housing.

BACKGROUND

There is a known technology in which a synthetic-resin splash guard, which covers an engine of an automobile from the side and the below so as to protect auxiliary equipment from a spray of water, has six triangle-shaped elastic flat pieces separated by six radially extending slits formed therein such that an opening is formed by pressing the elastic flat pieces so as to allow a tool to be inserted therethrough for maintenance of auxiliary equipment. This technology has been disclosed in Japanese Examined Utility Model Registration Application Publication No. 7-28060, the entire contents of which are incorporated herein by reference.

SUMMARY

In a case such as replacement of a bulb of a headlight, time required for the work could be significantly reduced when the replacement is performed as follows: Part of a synthetic-resin inner fender facing a rear side of the head light is opened so as to form a gap, and a hand is inserted through the gap to replace the bulb instead of removing the entire headlight unit from the vehicle body.

In this case, in order to open the part of the inner fender, an opening in which the finger is hooked needs to be formed in the inner fender. However, simply forming an opening may lead to a problem in that water or dust enters a vehicle body through the opening. The problem may be solved by a normally closed opening formed by the slits and elastic flat pieces in the inner fender so as to open the part of the inner fender using a finger hooked in the opening as described in Japanese Examined Utility Model Registration Application Publication No. 7-28060. However, there still has been a problem in that, when a finger is inserted into the opening described in Japanese Examined Utility Model Registration Application Publication No. 7-28060, ends of the elastic flat pieces are firmly pressed against the finger. Thus, it is not easy to apply forces to the elastic flat pieces.

The present application is proposed in view of the above described situation and provides a technology with which an inner fender is easily opened so as to be separated from a wheel arch of a fender panel to allow maintenance of a headlight.

According to an aspect of the embodiment, a vehicle body structure for an automobile is proposed. The vehicle body structure includes an inner fender, which is disposed on an inner side of a wheel arch of a fender panel with respect to a vehicle width direction and opposes an outer peripheral surface of a tire, so as to form a wheel housing. The vehicle body structure includes an openable area formed on a side edge on the wheel arch side of the inner fender, which faces a rear side of a head light. The openable area includes a finger hook having a tongue surrounded by a resin hinge and a slit portion. In the vehicle body structure, the tongue is openable outward from an inner side of the inner fender by a finger inserted from the resin hinge side to the slit portion side, and the openable area is openable from the wheel arch by the finger hooked in the slit portion.

By this structure, a gap is formed between the wheel arch of the fender panel and the openable area of the inner fender by opening the openable area. This allows a hand to be inserted through the gap so as to perform maintenance of the headlight. Thus, a need for removing the entire inner fender is eliminated, thereby reducing work time. Furthermore, a finger is inserted into the finger hook from the resin hinge side to the slit portion side. Thus, when the finger hook is pulled by the finger, a situation in which the finger is firmly pressed against the end of the tongue is suppressed, thereby improving work efficiency.

In the vehicle body structure for an automobile, the inner fender may include a C-shaped first bead that surrounds the openable area.

Thus, forces that open the openable area can be effectively concentrated in an area inside the first bead, thereby facilitating opening of the openable area.

In the vehicle body structure for an automobile, in which the inner fender includes a C-shaped first bead that surrounds the openable area, the inner fender may include a second bead that divides the openable area into two portions. In this case, the first bead together with the second bead forms an E-shape.

Thus, forces exerted on part of the openable area are transferred to the entirety of the openable area through the second bead, thereby allowing the openable area to be efficiently opened.

In any one of the above-described vehicle body structures for an automobile, the finger hook may be formed at an end of the openable area.

Thus, the openable area is gradually opened from the end side thereof where the finger hook is formed toward the inner side thereof. As a result, an opening for maintenance can be opened with a small amount of force.

In any one of the above-described vehicle body structures for an automobile, the inner fender may have a ridge on an inner side of the openable area with respect to the vehicle width direction.

Thus, forces that opens the openable area can be more effectively concentrated in the openable area, thereby facilitating opening of the openable area.

BRIEF DESCRIPTION OF THE DRAWINGS

The advantages of the disclosure will become apparent in the following description taken in conjunction with the drawings below.

FIG. 8 is a sectional view of the structure illustrated in FIG. 2 taken along line VIII-VIII in FIG. 2.

DETAIED DESCRIPTION

A first embodiment of the present application will be described below with reference to FIGS. 1 to 10.

Figure 1:
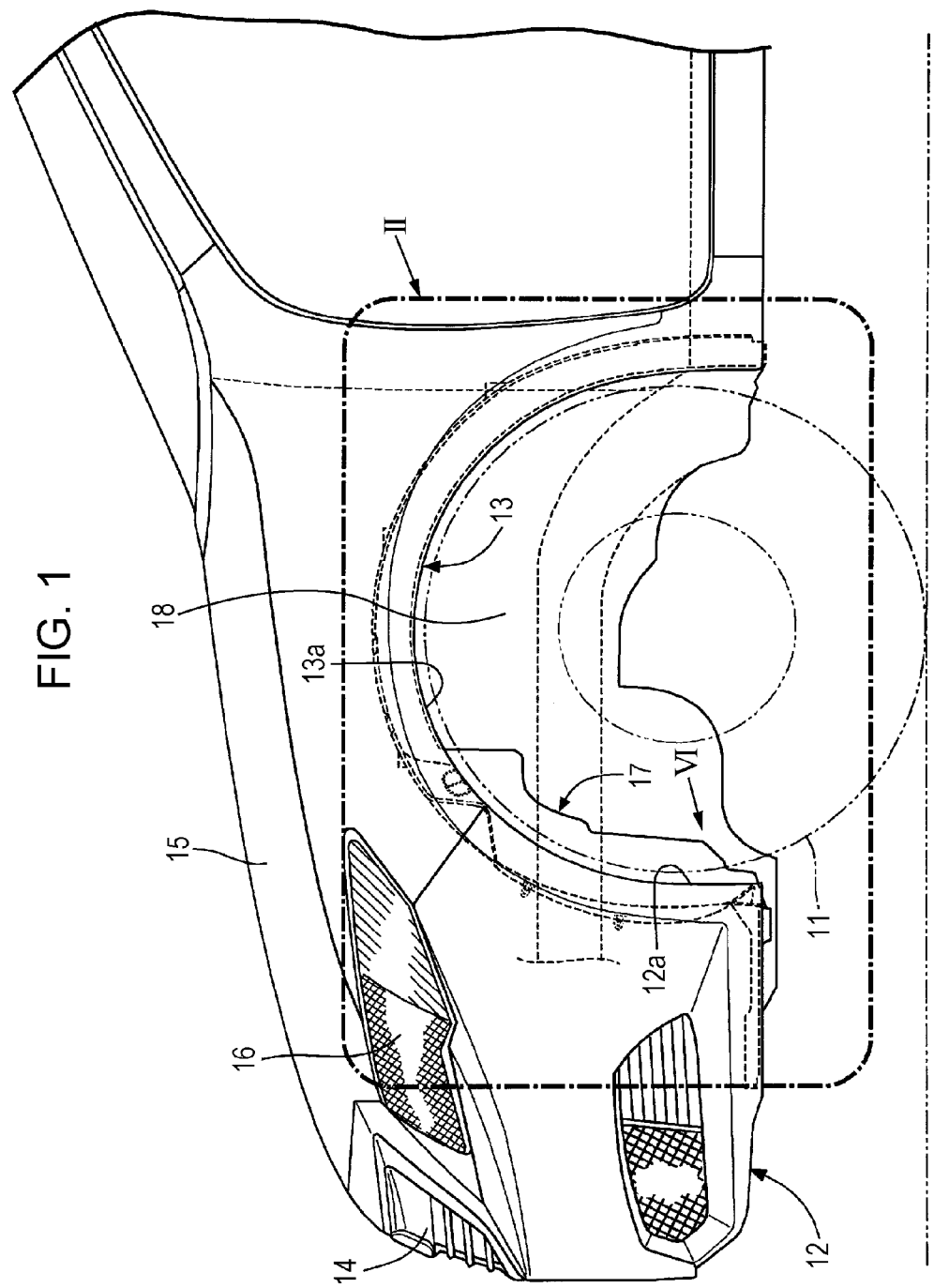
FIG. 1 is a left side view of a front portion of a vehicle body of an automobile.
Figure 2:
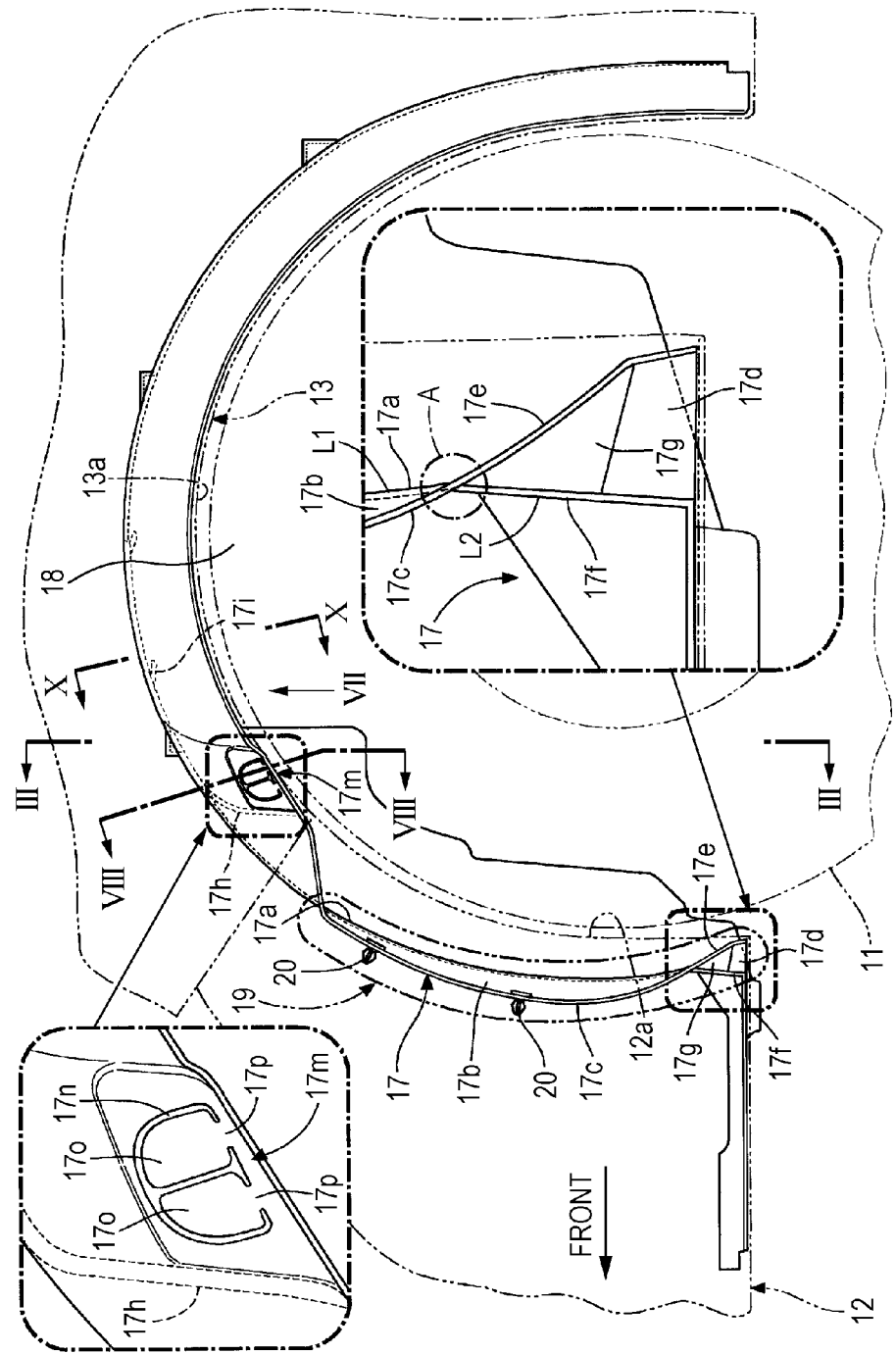
FIG. 2 is an enlarged view of part II in FIG. 1.

As illustrated in FIGS. 1 and 2, an upper half of a tire 11 for a front wheel, which is positioned at a front portion of a vehicle body of an automobile, is surrounded by a wheel arch 12a of a synthetic-resin bumper face 12 and a wheel arch 13a of a fender panel 13. The bumper face 12 is integrally formed with a front grille 14 connected to an upper portion thereof. An upper end of the fender panel 13 opposes an outer end of a bonnet 15 in the vehicle width direction. A headlight 16 is disposed at a position surrounded by the bumper face 12, the fender panel 13, the front grille 14, and the bonnet 15. An inner fender 17 formed of a soft synthetic-resin is disposed so as to be spaced apart from an outer peripheral surface of the upper half of the tire 11 by a specified gap. A wheel housing 18, which houses the tire 11, is formed on an inner side of the inner fender 17. The inner fender 17 is generally formed by injection molding using a mold including upper and lower halves. The inner fender 17 has an undercut portion 19 at a front portion thereof. In order to form the undercut portion 19 in molding, slide cores are used as described below.

Figure 3:
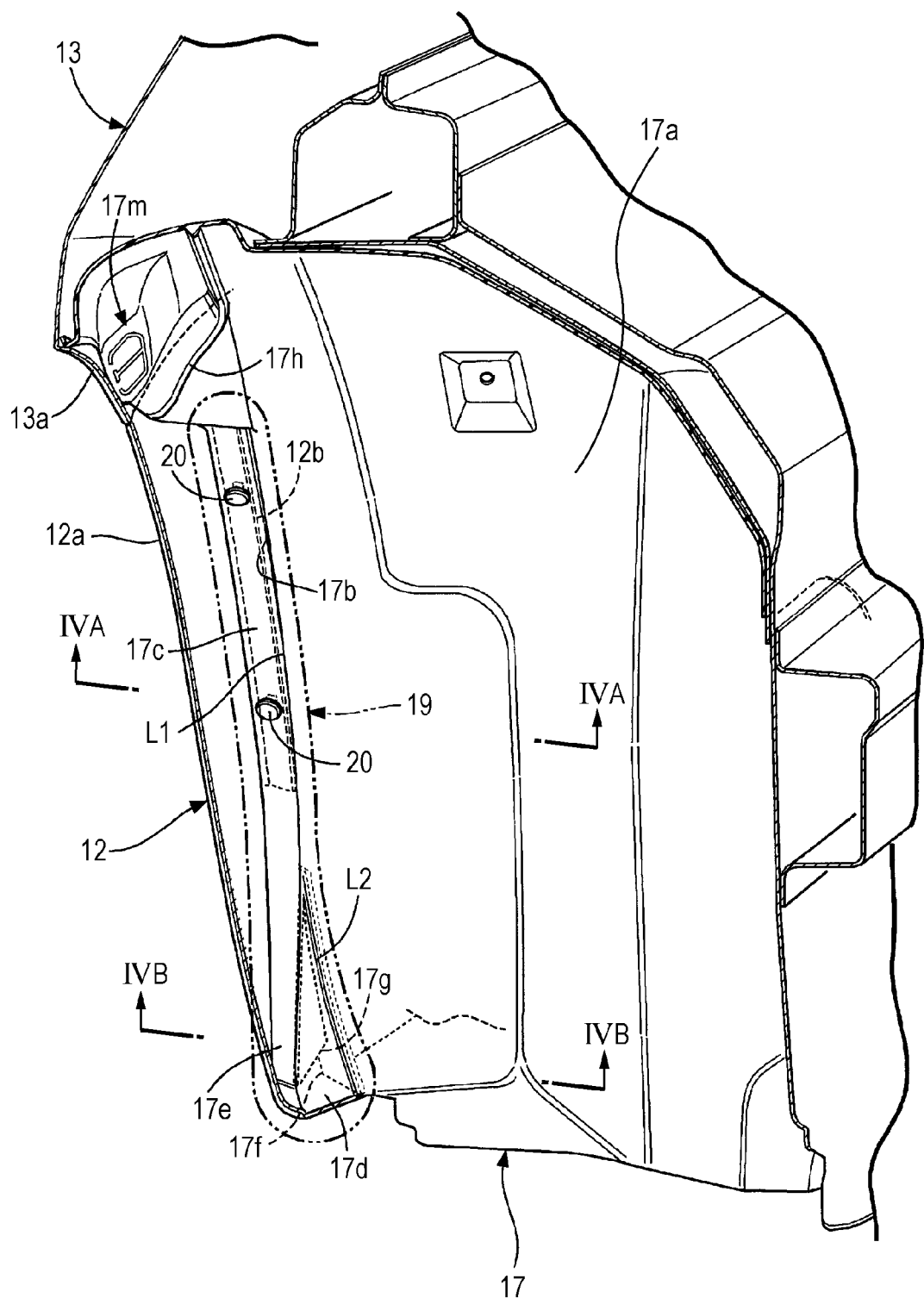
FIG. 3 is a sectional view of a structure illustrated in FIG. 2 taken along line in FIG. 2.
Figure 4A:
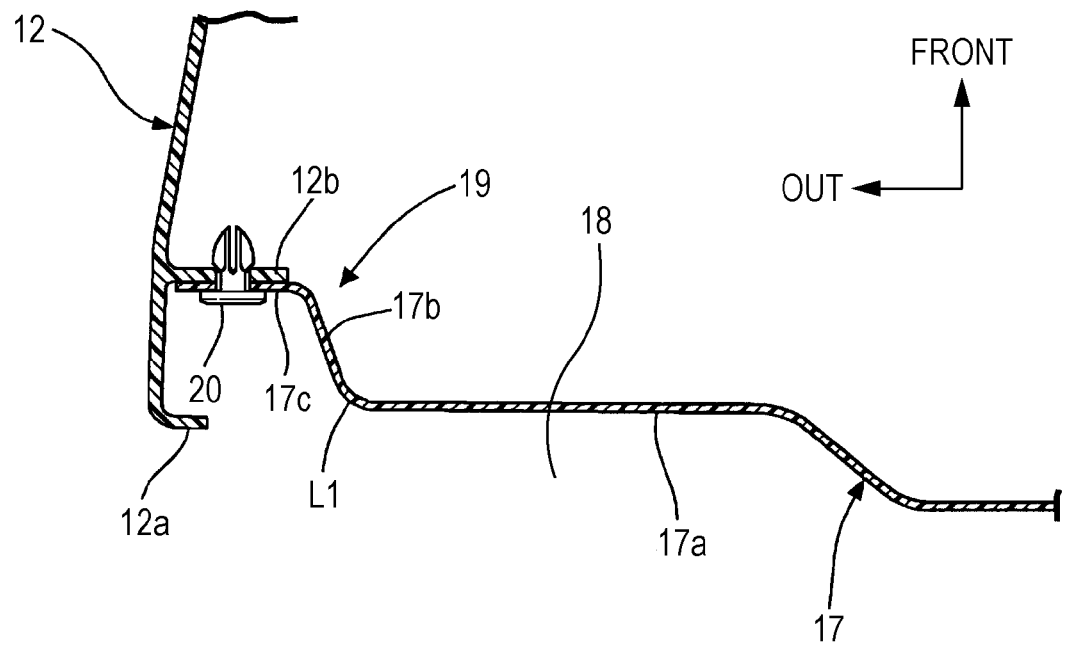
FIGS. 4A and 4B are sectional views of a structure illustrated in FIG. 3 respectively taken along line IVA-IVA and line IVB-IVB in FIG. 3.

Next, the shape of the undercut portion 19 in the front portion of the inner fender 17 will be described with reference to FIGS. 3 and 4. The inner fender 17 has an arch-shaped inner peripheral wall 17a opposite to the radially outer peripheral surface of the tire 11. The undercut portion 19 is formed on an outer side of the inner peripheral wall 17a with respect to the vehicle width direction. The undercut portion 19 has upper and lower parts. As illustrated in FIG. 4A, the upper part of the undercut portion 19 has an upper side wall 17b and an upper flange 17c. The upper side wall 17b extends forward from an upper ridge L1 formed at an outer end of the inner peripheral wall 17a in the vehicle width direction. The upper flange 17c extends further outward in the vehicle width direction from a front end of the upper side wall 17b. The upper flange 17c is secured to a rib 12b, which protrudes from an inner surface of the bumper face 12, with clips 20.

Figure 4B:
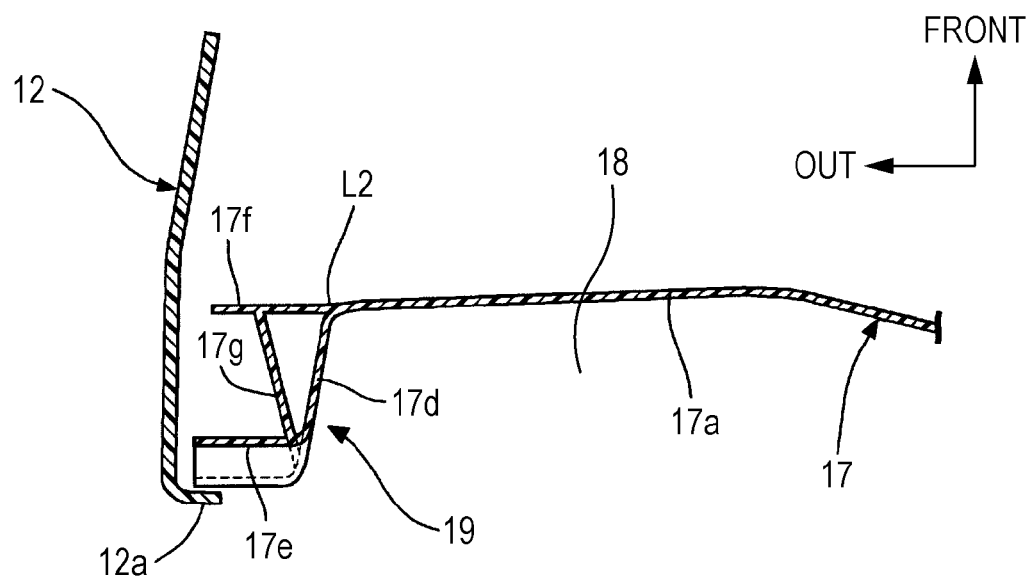

As illustrated in FIG. 4B, the lower part of the undercut portion 19 has a lower side wall 17d, a lower flange 17e, an extended wall 17f, and a triangle reinforcing rib 17g. The lower side wall 17d extends rearward from a lower ridge L2 formed at the outer end of the inner peripheral wall 17a in the vehicle width direction. The lower flange 17e extends outward in the vehicle width direction from a rear end of the lower side wall 17d. The inner peripheral wall 17a extends outward in the vehicle width direction beyond the lower side wall 17d so as to form the extended wall 17f. The reinforcing rib 17g connects a rear surface of the extended wall 17f to a front surface of the lower flange 17e. Thus, as illustrated in an enlarged view in FIG. 2, a line passing along the upper flange 17c and the lower flange 17e and a line passing along the inner peripheral wall 17a (upper ridge L1) and the extended wall 17f (lower ridge L2) intersect each other at an intersection "A" so as to form an X-shape.

Figure 5:
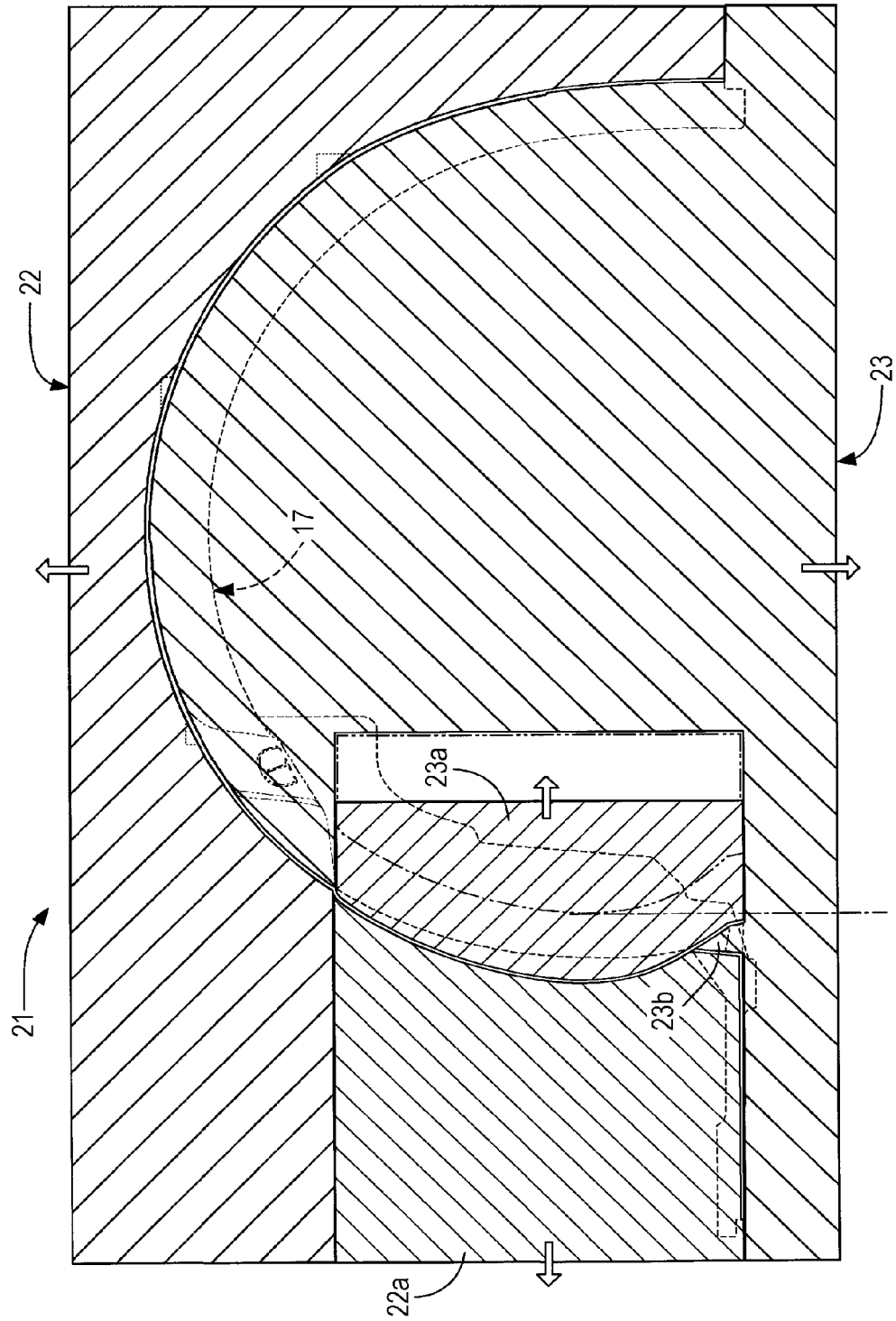
FIG. 5 illustrates a mold used to form an inner fender by injection molding.

FIG. 5 illustrates a mold 21 used to form the inner fender 17 by injection molding. The mold 21 includes an upper half 22 and a lower half 23. The upper half 22 includes a first slide core 22a that is slidable forward from its closed position. The lower half 23 includes a second slide core 23a that is slidable rearward from its closed position. Herein, the terms "forward" and "rearward" referring to the directions of the mold correspond to the respective directions of the inner fender on the vehicle. The first slide core 22a and the second slide core 23a are used to form the undercut portion 19 of the inner fender 17. As can be clearly seen from FIGS. 4A and 4B, the first slide core 22a is used to form an inner surface of the upper side wall 17b with respect to the vehicle width direction, a front surface of the upper flange 17c, and a front surface of the extended wall 17f. The second slide core 23a is used to form an outer surface of the upper side wall 17b with respect to the vehicle width direction, a rear surface of the upper flange 17c, an inner surface of the lower side wall 17d with respect to the vehicle width direction, and a rear surface of the lower flange 17e. The lower half 23 has a protrusion 23b, which enters a space formed by the first slide core 22a and the second slide core 23a, thereby forming the rear surface of the extended wall 17f, the front surface of the lower flange 17e, an outer surface of the lower side wall 17d with respect to the vehicle width direction, and the reinforcing rib 17g.

As described above, since the inner fender 17 has the undercut portion 19 formed therein, the upper half 22 and lower half 23 of the mold 21 without the first and second slide cores 22a and 23a could not be opened in up-down directions. According to the present embodiment, the upper half 22 includes the first slide core 22a that is slidable forward, and the lower half 23 includes the second slide core 23a that is slidable rearward. Since the upper and lower halves 22 and 23 are opened in the up-down directions after the first and second slide cores 22a and 23a have been slid and opened in a front-rear directions, the undercut portion 19 can be molded without problems.

Figure 7A:
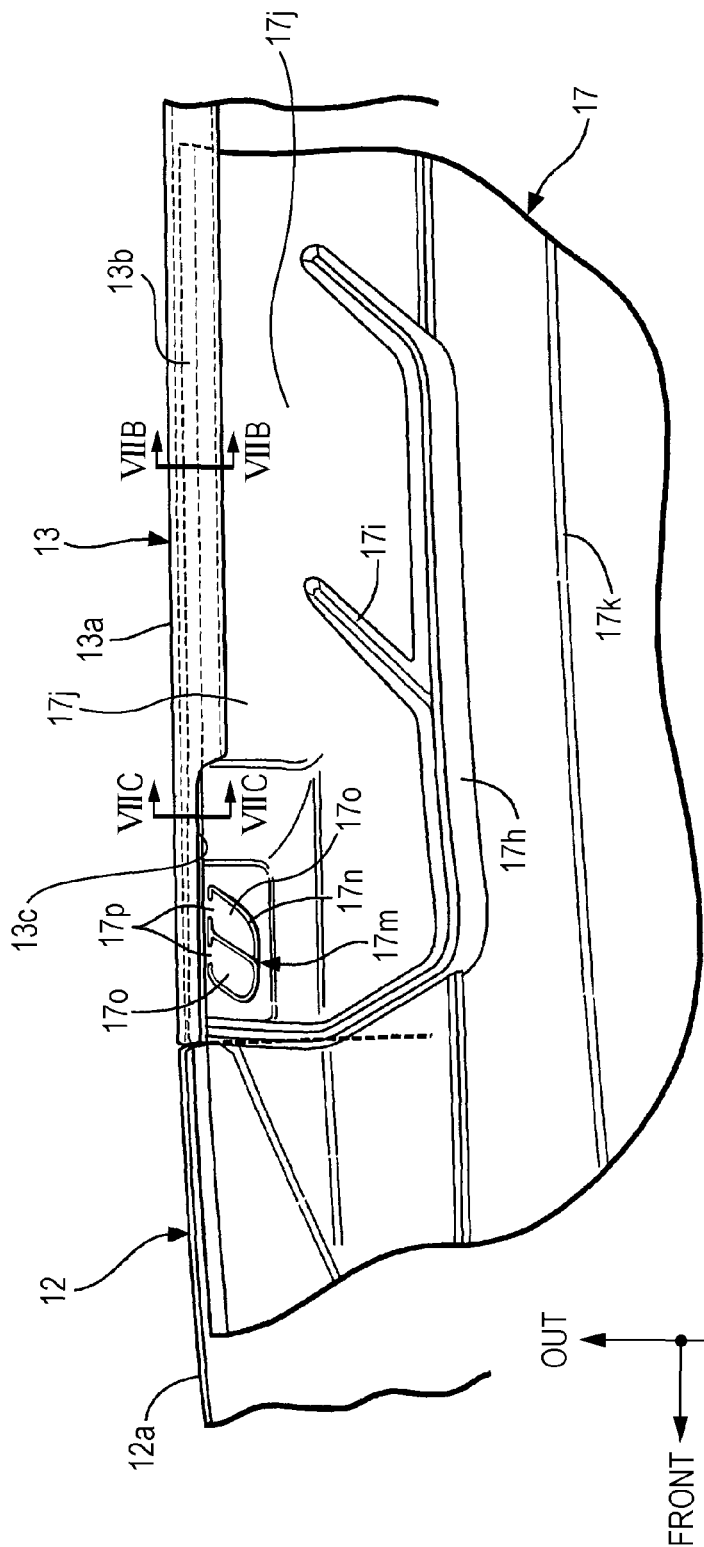
FIG. 7A is a diagram of the structure illustrated in FIG. 2 seen from a direction indicated by an arrow VII in FIG. 2, and FIGS. 7B and 7C are sectional views taken along lines VIIB-VIIB and VIIC-VIIC, respectively.

As illustrated in FIGS. 2, 7A, and 8, a C-shaped first bead 17h is formed in a portion in which the inner fender 17 faces a front portion of the wheel arch 13a of the fender panel 13. Each end of the first bead 17h extends toward the wheel arch 13a of the fender panel 13, and an elastically deformable openable area 17j is set in an area inside the first bead 17h. An I-shaped second bead 17i is formed in an area inside the first bead 17h. The first bead 17h together with the second bead 17i forms an E-shaped bead. A ridge 17k, which extends in a circumferential direction of the inner fender 17, is formed at a position adjacent to the first bead 17h on the inner side of the first bead 17h with respect to the vehicle width direction.

A finger hook 17m is formed at a front end of the openable area 17j at a position near the wheel arch 13a of the fender panel 13. The finger hook 17m is structured such that tongues 17o, which are formed of two pieces separated and surrounded by an ϵ-shaped slit portion 17n, are openably supported by resin hinges 17p. Since the inner fender 17 is formed of a soft synthetic-resin, the resin hinges 17p are functional due to the elasticity the synthetic-resin itself has. The finger hook 17m is arranged such that the resin hinges 17p are located on a lower side and the slit portion 17n is located on an upper side.

Figure 7B:
Figure 7C:
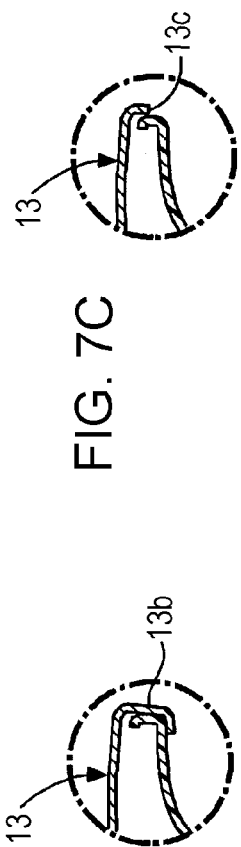

As illustrated in FIG. 7B, an outer end edge of the inner fender 17 with respect to the vehicle width direction is engaged with a flange 13b of the wheel arch 13a of the fender panel 13. However, as illustrated in FIG. 7C, near the finger hook 17m, a part of the flange 13b is trimmed so as to form a flange cut portion 13c.

Next, operation of the embodiment of the present application having the above-described structure will be described.

Figure 6A:
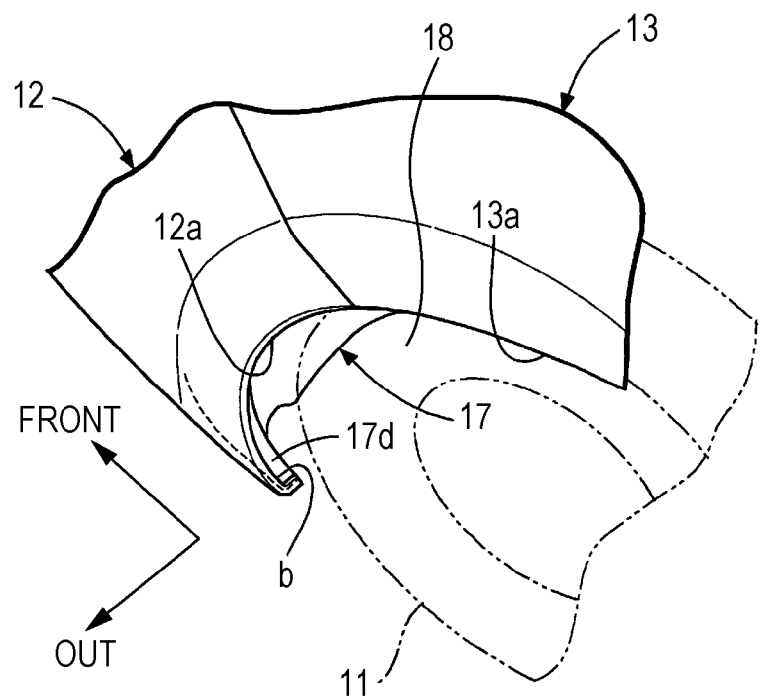
FIGS. 6A and 6B are diagrams of a structure illustrated in FIG. 1 seen from a direction indicated by an arrow VI in FIG. 1.
Figure 6B:
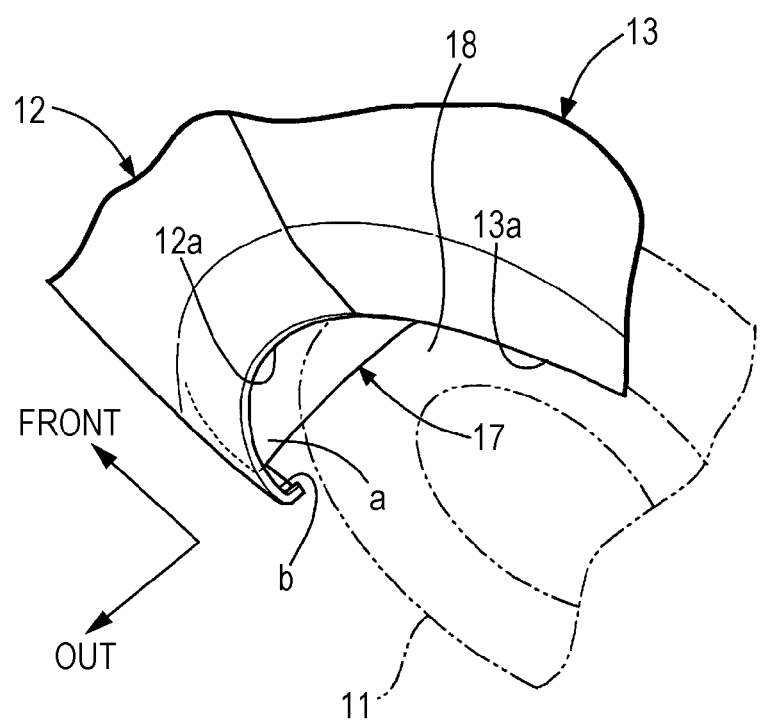

The undercut portion 19 of the inner fender 17 has the lower side wall 17d. Thus, as illustrated in FIG. 6A, when the wheel housing 18 is seen from a diagonally rearward direction, the lower side wall 17d of the inner fender 17 is superposed with a surface of a lower end of the wheel arch 12a of the bumper face 12, the surface being an inner surface with respect to the vehicle width direction. Thus, the lower end of the wheel arch 12a of the bumper face 12 has a thick appearance, and accordingly, the appearance thereof is improved. In a comparative example illustrated in FIG. 6B, the inner fender 17 does not have the lower side wall 17d, and accordingly, a thin edge of the lower end of the wheel arch 12a of the bumper face 12 is exposed. This degrades the appearance.

Furthermore, the upper side wall 17b of the undercut portion 19 of the inner fender 17 is spaced apart from and in front of the wheel arch 12a of the bumper face 12. The upper flange 17c, which is bent outward in the vehicle width direction at the front end of the upper side wall 17b, is secured to the rib 12b of the bumper face 12 with the clips 20, and accordingly, the positions of the clips 20 are separated from and in front of the wheel arch 12a. Thus, it is unlikely that the clips 20 will be visible through the wheel housing 18, thereby further improving the appearance.

The undercut portion 19 has the upper ridge L1 and the lower ridge L2 that are continuous with each other in the up-down direction. In addition, the upper side wall 17b extends forward from the upper ridge L1 and the lower side wall 17d extends rearward from the lower ridge L2. Thus, due to the upper ridge L1 and the lower ridge L2, the stiffness of the undercut portion 19 is increased. This can suppress the shift of the position of the lower side wall 17d relative to the lower end of the wheel arch 12a of the bumper face 12.

The stiffness of the undercut portion 19 is also increased by the triangle reinforcing rib 17g, which connects the rear surface of the extended wall 17f to the front surface of the lower flange 17e. The reinforcing rib 17g is continuous with an area near the lower ridge L2 (see FIG. 4B). Thus, the lower ridge L2 can decrease the visibility of depression of the molded product when resin is cured due to the reinforcing rib 17g formed.

In order to perform maintenance such as replacement of a bulb of the headlight 16, removal of the inner fender 17 is no longer necessary. Maintenance such as replacement of the bulb of the headlight 16 is performed by opening the openable area 17j of the inner fender 17 inward and by inserting a hand into a gap α formed between the wheel arch 13a of the fender panel 13 and the openable area 17j. This can significantly improve maintainability.

Figure 9:
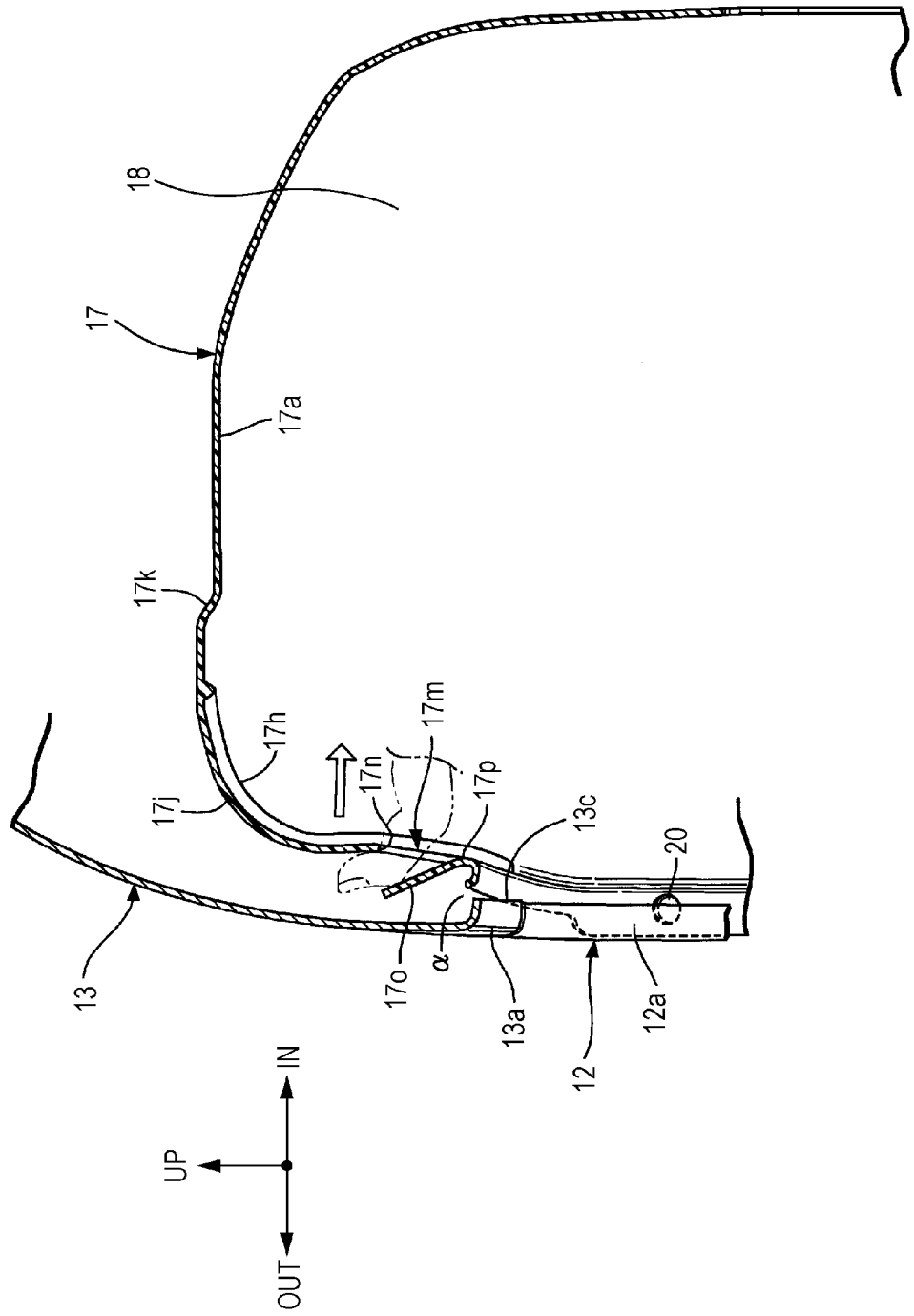
FIG. 9 illustrates operation of a structure illustrated in FIG. 8.
Figure 10:
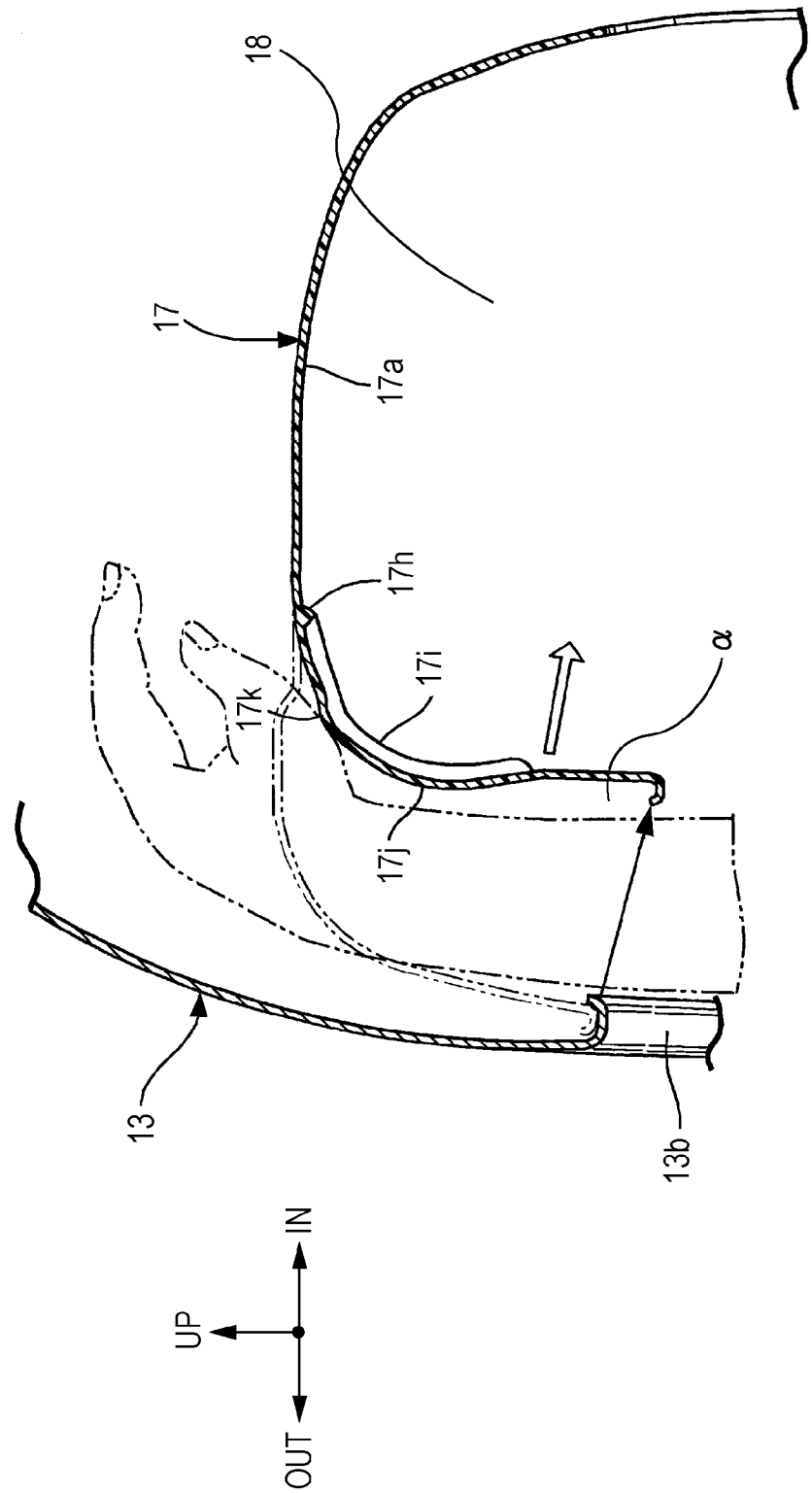
FIG. 10 is a sectional view of the structure illustrated in FIG. 2 taken along line X-X in FIG. 2.
Figure 11A:
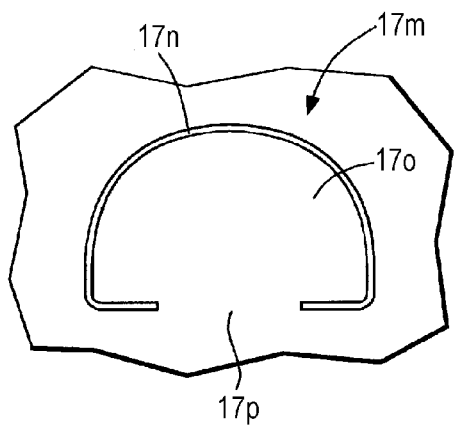
FIG. 11 illustrates other embodiments of a finger hook.
Figure 11B:
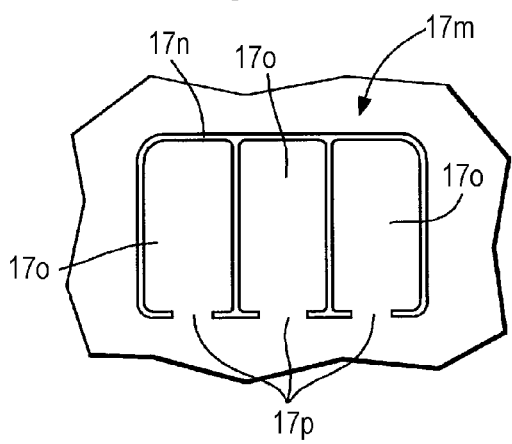
Figure 11C:
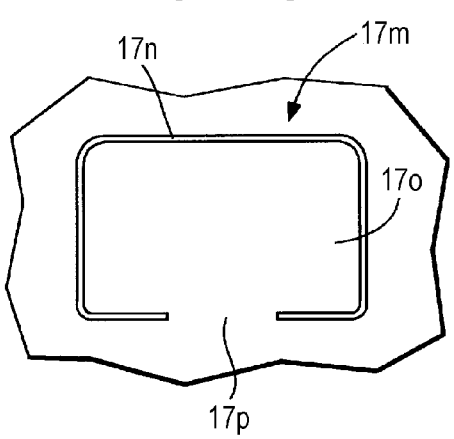
Figure 11D:
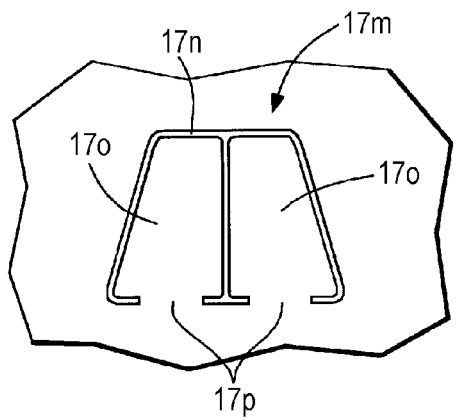
Figure 11E:
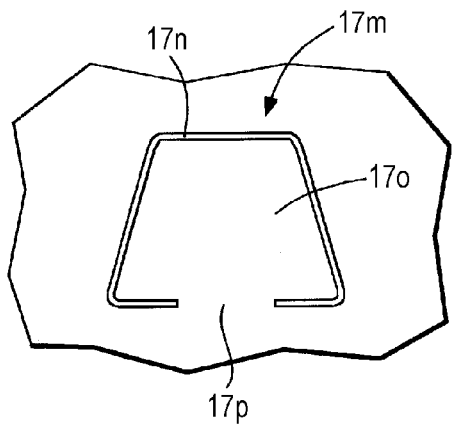

To do this, an automobile is initially jacked up, a hand of an operator is inserted into the wheel housing 18, and as illustrated in an enlarged view in FIG. 8, the tongues 17o of the finger hook 17m are pressed by the fingers so as to open the tongues 17o outward about the resin hinges 17p. Then, as illustrated in FIG. 9, the fingers are hooked in the slit portion 17n of the finger hook 17m and the finger hook 17m is pulled inward in the vehicle width direction. An outer edge of the openable area 17j of the inner fender 17 in the vehicle width direction is removed from the flange cut portion 13c of the wheel arch 13a of the fender panel 13. Starting from the removal of the outer edge, the entire openable area 17j is opened from the wheel arch 13a of the fender panel 13, thereby forming a gap α. Thus, as illustrated in FIG. 10, the operator can insert the hand into the gap α so as to perform maintenance such as replacement of the bulb of the headlight 16.

When the tongues 17o of the finger hook 17m are pressed to open by the fingers, the fingers are hooked in the slit portion 17n, and the slit portion 17n is pulled inward in the vehicle width direction (see FIG. 9). Thus, due to the arrangement in which the resin hinges 17p are located on a front side and the slit portion 17n is located on a rear side with respect to a direction of finger insertion, a situation in which the fingers are firmly pressed against edges at the ends of the tongues 17o is suppressed. This improves work efficiency.

When the openable area 17j is opened, since the finger hook 17m is formed at the end of the openable area 17j, the openable area 17j is gradually opened from the end side thereof where the finger hook 17m is formed toward the opposite end side thereof. Thus, the openable area 17j can be opened so as to form a gap α for operation with a small amount of force.

Since the flange cut portion 13c, which is formed by cutting part of the flange 13b of the fender panel 13, is formed near the finger hook 17m, when the fingers are hooked in the finger hook 17m to pull the finger hook 17m, the inner fender 17 can be easily removed from the fender panel 13 so as to form the gap α.

Since the inner fender 17 has the C-shaped first bead 17h that surrounds the openable area 17j, forces that open the openable area 17j can be effectively concentrated in an area inside the first bead 17h, thereby improving work efficiency. The inner fender 17 has the ridge 17k on the inner side of the openable area 17j with respect to the vehicle width direction. Thus, the ridge 17k improves the stiffness of an area outside the openable area 17j, thereby allowing the forces that open the openable area 17j to be more effectively concentrated in the openable area 17j.

In addition, the inner fender 17 has the second bead 17i, which divides the openable area 17j into two portions, and the first bead 17h together with the second bead 17i forms an E-shaped structure. As a result, forces exerted on part of the openable area 17j are transferred to the entire openable area 17j by the second bead 17i, thereby allowing the openable area 17j to be efficiently opened.

A second embodiment of the present application will be described below with reference to FIG. 11.

The finger hook 17m of the inner fender 17 may have any of a variety of shapes as illustrated in FIG. 11 as long as the finger hook 17m has the tongue 17o surrounded by the slit portion 17n and the resin hinge 17p.

Although the embodiments of the present application have been described above, a variety of design changes may be made to the embodiments of the present application without departing from the gist of the present application.

For example, the shapes of the first bead 17h, the second bead 17i, and the openable area 17j are not limited to the shapes of the above-described the embodiments. The first bead 17h, the second bead 17i, and the openable area 17j may be desirably shaped.

We claim:

1. A vehicle body structure for an automobile including an inner fender disposed on an inner side of a wheel arch of a fender panel with respect to a vehicle width direction and opposing an outer peripheral surface of a tire so as to form a wheel housing, the vehicle body structure comprising:
   an openable area formed on a side edge located on the wheel arch side of the inner fender, the openable area facing a rear side of a head light, the openable area including a finger hook having a tongue being surrounded by a hinge and a slit portion, wherein the tongue is openable outward from an inner side of the inner fender by a finger inserted from the hinge side to the slit portion side, and wherein the openable area is openable from the wheel arch by the finger hooked in the slit portion.

2. The vehicle body structure for an automobile according to claim 1, wherein the inner fender includes a C-shaped first bead surrounding the openable area.

3. The vehicle body structure for an automobile according to claim 2, wherein the inner fender includes a second bead dividing the openable area into two sections such that the first bead together with the second bead forms an E-shape.

4. The vehicle body structure for an automobile according to claim 1, wherein the finger hook is formed at an end of the openable area.

5. The vehicle body structure for an automobile according to claim 1, wherein the inner fender has a ridge on an inner side of the openable area with respect to the vehicle width direction.

6. The vehicle body structure for an automobile according to claim 1, wherein the wheel arch includes an engaging flange at an edge thereof, wherein an outer edge of the inner fender with respect to the vehicle width direction is engaged with the engaging flange such that the openable area is opened by releasing the outer edge of the inner fender from the engaging flange.

7. The vehicle body structure for an automobile according to claim 6, wherein the engaging flange is trimmed to form a flange cut portion to facilitate releasing the outer edge of the inner fender near the finger hook.

8. The vehicle body structure for an automobile according to claim 1, wherein the hinge includes a resin hinge.

* * * * *